UNITED STATES PATENT OFFICE.

MOSES A. JOHNSON, OF LOWELL, MASSACHUSETTS.

IMPROVEMENT IN FELTED FABRICS.

Specification forming part of Letters Patent No. 41,073, dated January 5, 1864; Reissue No. 2,251, dated May 22, 1866.

*To all whom it may concern:*

Be it known that I, MOSES A. JOHNSON, of Lowell, in the county of Middlesex and State of Massachusetts, have invented a new and useful Improvement in Felted Fabrics; and I do hereby declare that the following is a full, clear, and exact description thereof, which will enable others skilled in the art to fully understand and make use of the same.

This invention consists in a felted fabric made of cattle-hair mixed with a small proportion of silk-waste, cotton, or other fibrous material, coated on one or both surfaces, but not saturated, with a thin film of glue, size, gum, or other suitable material or solution, in such a manner that a felted fabric is obtained which combines in a higher degree the qualities of lightness, strength, and elasticity than ordinary felted fabrics, and which is applicable for various purposes. such as ship-felt, steam-pipe felt, packing for medicines, glassware, &c., tailors' padding and wadding, and carpet-felt.

This fabric, which should be but slightly felted, may be manufactured in pieces of from twenty to thirty yards in length and one yard in width, or of other suitable length and width, as may be most convenient for the purpose to which it is to be applied. The process of manufacturing the felted web is the same as that of manufacturing other felted fabrics, and the sizing is applied to one or both surfaces by means of a brush or by passing it between suitable rollers, one or more of which rotate in or have their surfaces supplied with the sizing material.

For ship-felt I use an article of light weight sized or glazed on one side only, the soft or unsized side next the ship and the glazed side next the copper. Being put on the ship's bottom with tar, the soft surface adheres to the tar and obviates the necessity of tacking, and the sized surface gives it additional strength for handling, enabling the calker to take a roll of it in his arms and apply it to the ship. Loosely felted goods used for this purpose, and without sizing, require to be thick, as it would not otherwise bear the handling and would be blown into the dock by a gust of wind, and thick felt is objectionable, as it holds a greater quantity of water, and often bulges out the copper, and, moreover, requires longer nails, and thereby entails greater expense, besides the greater expense of the felt itself.

For pipe-felt it will be sufficient to size one surface, and when sized it can be wound more compactly round the pipe, and thus takes less room, besides presenting a neater appearance.

For padding or packing felt I usually size it on both surfaces, and it is thus made very elastic between the surfaces. The sizing enables it to be cut to greater advantage, unsized felt yielding to the edge of the cutting-instrument. The sized felt also retains its shape better after cutting, and, sized on both sides, it can be more economically handled by the tailor in fitting it to a garment, and the size prevents the hair from pricking either through the lining or exterior of the garment.

For carpet-felt it will be sufficient to size one side only—viz., that which comes next the carpet. The size prevents the felt from adhering to the carpet and serves to retain the elasticity of the felt and render it more durable.

I am aware that felted goods have been composed of hair and silk-waste or cotton united or felted by means of a sizing or adhesive solution, (see English Patent of W. A. Robertson, dated April 4, 1838;) but the sizing in this case impairs the elasticity and makes an article of different character from my fabric.

I am also aware that in the United States Patent of C. L. Fleischmann, dated June 17, 1847, is described a wadding composed of animal-hair confined between two thin glazed sheets of cotton; but this I also regard as different from my fabric.

What I claim as new, and desire to secure by Letters Patent, is—

The sheet felted fabric herein described, having one or both surfaces coated with a film of sizing, as set forth, but the body of the fabric not saturated or impregnated with the sizing material.

MOSES A. JOHNSON.

Witnesses:
H. DENNETT,
H. B. SHATTUCK.